United States Patent [19]

Loeber et al.

[11] Patent Number: 4,843,910

[45] Date of Patent: Jul. 4, 1989

[54] PINION GEAR SPEED DISC BRAKE

[75] Inventors: Frederick W. Loeber; Terrence L. Doden; Ronald R. Massie, all of Tulsa, Okla.

[73] Assignee: Unit Rig & Equipment, Tulsa, Okla.

[21] Appl. No.: 109,739

[22] Filed: Oct. 19, 1987

[51] Int. Cl.[4] .............................. F16H 57/10
[52] U.S. Cl. ...................... 74/762; 74/801; 188/18 A
[58] Field of Search .............. 74/764, 765, 758, 759, 74/762, 763, 781 R; 188/18 A; 464/162; 192/110.5

[56] References Cited

U.S. PATENT DOCUMENTS

| Re. 27,126 | 5/1971 | Gingery | 192/110.5 |
|---|---|---|---|
| 3,161,249 | 12/1984 | Bouladon et al. | 180/10 |
| 3,347,333 | 10/1967 | Edwards | 180/65 |
| 3,434,364 | 3/1969 | Keese | 74/391 |
| 3,543,899 | 12/1970 | Colbert | 464/162 |
| 3,754,625 | 8/1973 | Voth et al. | 192/4 A |
| 3,892,300 | 7/1975 | Hapeman | 74/391 |
| 4,010,830 | 3/1977 | Logus | 74/785 |
| 4,282,952 | 8/1981 | Bartley | 301/6 E |
| 4,330,045 | 5/1982 | Myers | 74/764 |
| 4,406,340 | 9/1983 | Gennaux | 188/18 A |
| 4,418,775 | 12/1983 | Leroux | 180/9.62 |

*Primary Examiner*—Dirk Wright
*Attorney, Agent, or Firm*—Head & Johnson

[57] ABSTRACT

An improved braking system for a vehicle which has a wheel support in which an electric motor is housed having a drive shaft. A first and second planetary gear system are connected to drive the wheel from the motor drive shaft. The gear system includes a sun gear axially aligned with the shaft. A brake disc is supported by a disc carrier which is rotatably mounted on the gear housing. A floating disc adaptor is provided to transfer rotational movement of the sun gear to the disc carrier. Thus the brake disc rotates at the same rotational speed as the sun gear which is about five times faster than the rotation of the wheels of the vehicle.

5 Claims, 3 Drawing Sheets

PINION GEAR SPEED DISC BRAKE

DISCLOSURE STATEMENT

A patentability search revealed the following patents:

| | |
|---|---|
| Francis Bartley | 4,282,952 |
| Bouladon et al | 3,161,249 |
| Hapeman et al | 3,892,300 |
| Edwards | 3,347,333 |
| Leroux | 4,418,775 |
| Voth et al | 3,754,625 |
| Keese | 3,434,364 |

Most of the patents show devices such as the patents to Myers and Bartley where the brake disc is rotated with the rim or where the disc rotates with the motor drive shaft, such as with the patents to Hapeman et al and Edwards. The patent to Bouladon et al show the disc brake arrangement attached to a gearing system intermediate that of the rim and the motor drive shaft. The brake system is a eccentrically arranged relative to the motor drive shaft.

BACKGROUND OF THE INVENTION

This invention relates to an improved braking system for a vehicle which has a wheel support which supports a motor having a drive shaft within a hub and which has gears connected to drive the wheel from the motor drive shaft.

One form of off the road heavy-duty vehicles used for carrying large loads provides that an electric motor be disposed within the wheel with a gear system connecting the motor shaft of the electric motor to a ring gear attached to the wheel itself. In one widely used such set, the motor shaft is connected to a wheel rim ring gear by various intermediate gears. Thus rotation of the motor shaft rotates the ring gear which drives the wheels. In these cases the brake disc is rotated with the rim of the wheel or is directly rotated with the motor drive shaft at the same speed.

SUMMARY OF THE INVENTION

A power source, such as an electric motor, or mechanical drive train is supported by a housing which also supports a wheel for a vehicle. The drive shaft of the motor engages and rotates a first stage planet gear which meshes with a first stage ring gear which is fixed to a housing. Rotation of the first stage planet gear rotates a first carrier for the first stage planet gear. A second stage planet gear is meshed with a second stage gear ring which is fixed to the wheel. Thus, rotation of the second stage planet gear rotates the wheel. The second stage planet gear is connected through a second stage sun gear to the first stage carrier of the planet gear.

The brake disc is supported by a disc carrier which is attached to the disc. A floating adaptor is provided between the sun gear and the disc carrier such that the disc carrier is essentially axially aligned with the axis of the sun gear. Thus the brake disc rotates at the same revolution per minute (rpm) as the sun gear. This is approximately five times faster than the rpm of the wheel. This gives much higher torque potential than when the disc is rotated by the wheel itself.

DETAILED DESCRIPTION OF THE PREFERRED EMBODIMENT

Figure 1:
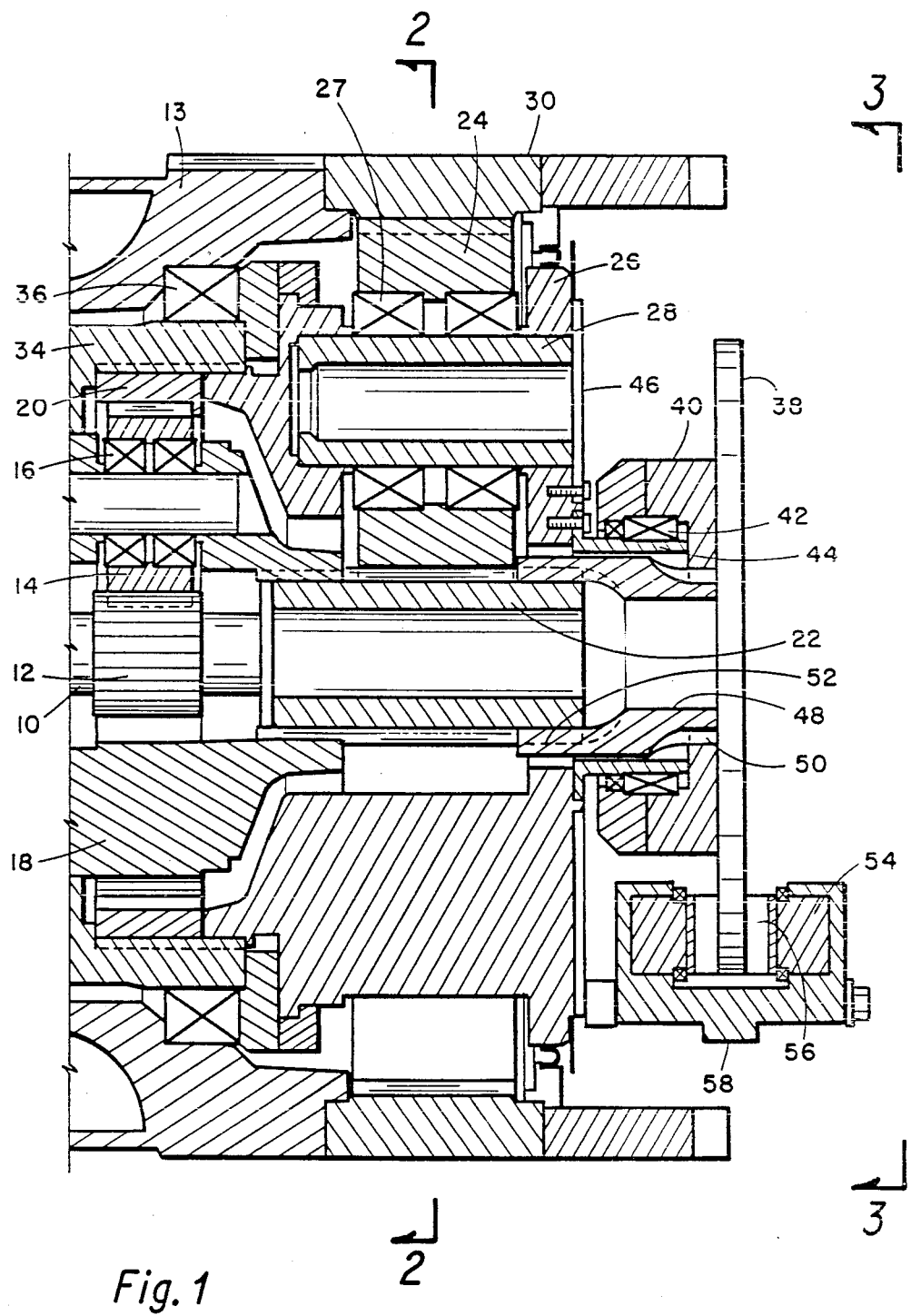
FIG. 1 is a cross-sectional view of a two-stage planetary gear driving system for driving wheels from a motor and includes the brake disc attached thereto.
Figure 2:
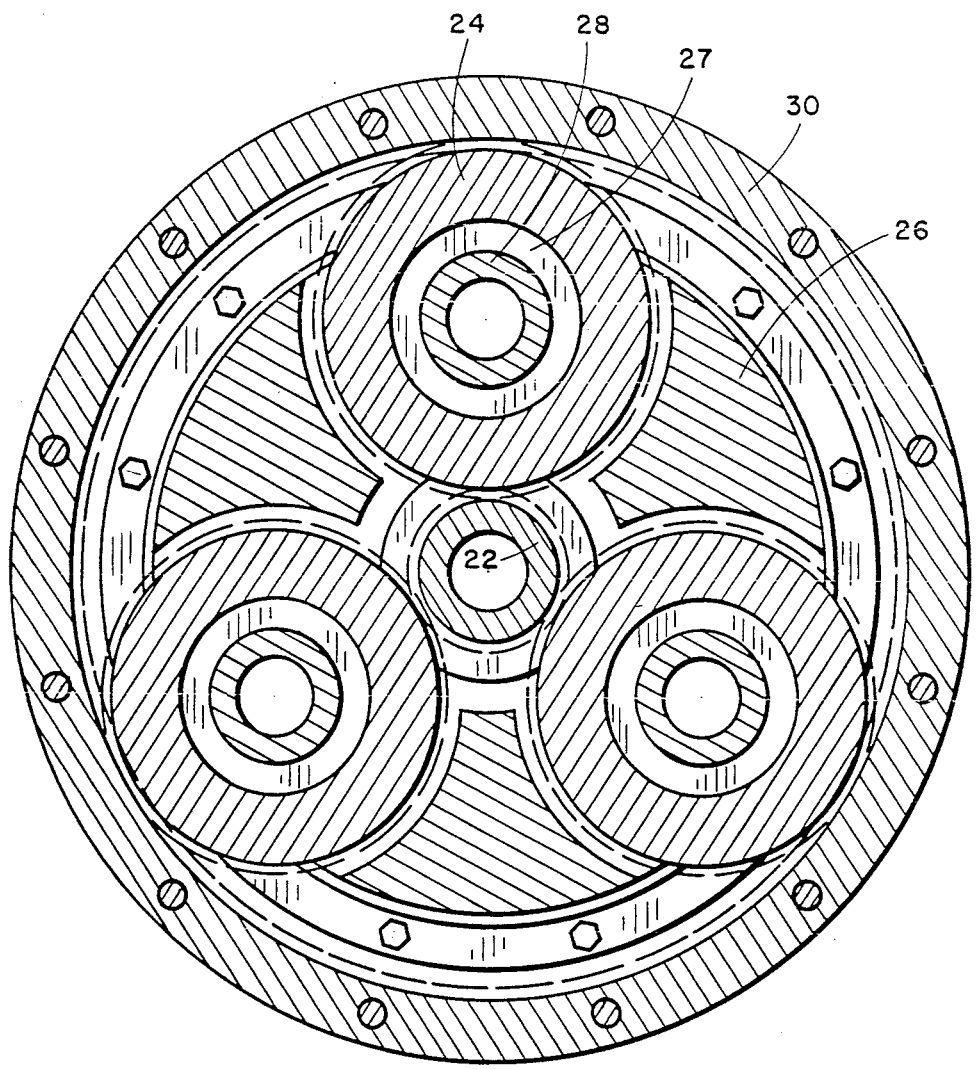
FIG. 2 is a view taken along the line 2—2 of FIG. 1.
Figure 3:
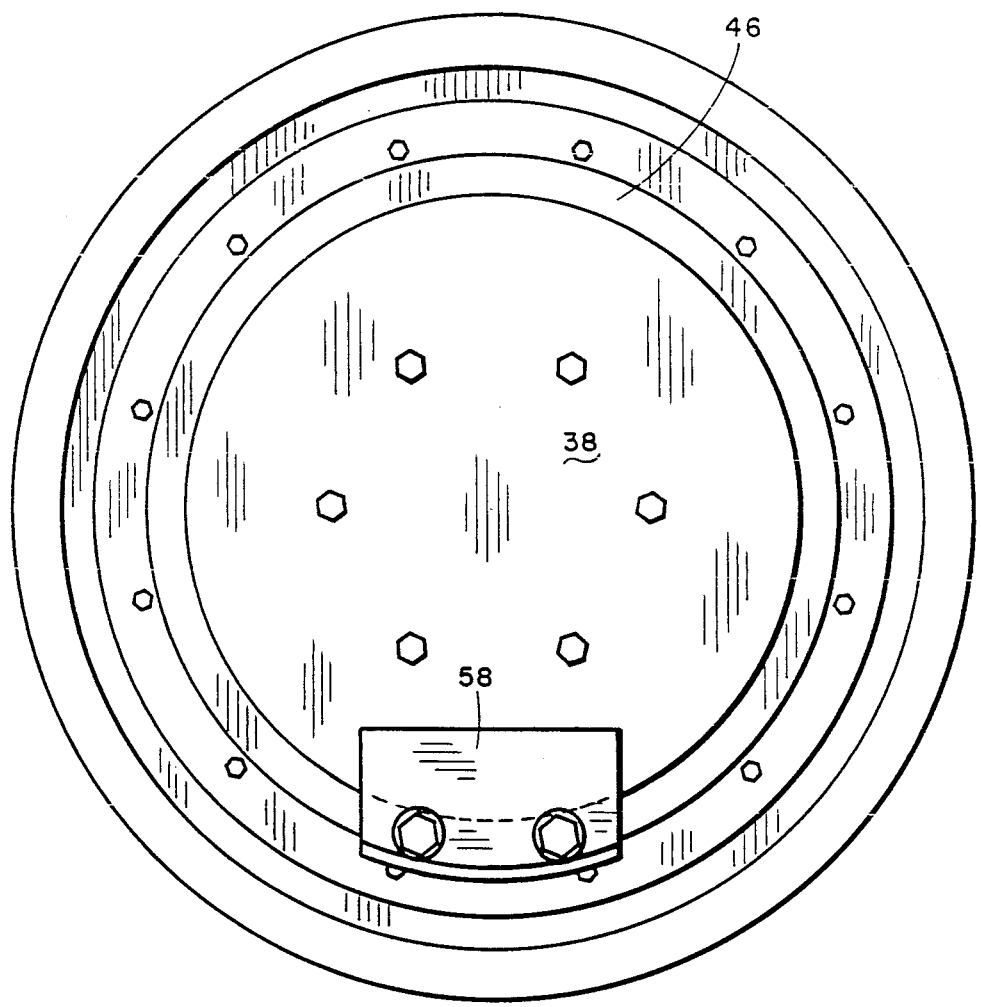
FIG. 3 is a view taken along the line 3—3 of FIG. 1.

Attention is first directed to FIG. 1. Shown thereon is a shaft 10 which is rotated by a motor not shown. Also shown thereon is a part of wheel 13 upon which a rubber tire is mounted. A gear drive train connects the shaft 10 and the wheel 13.

Shaft 10 has gears 12 which meshes with first stage planet gear 14 which is supported by bearings 18 from a carrier 18 for the first stage planet gears. The first stage planet gear 14 meshes with first stage ring gear 20 which is stationary. A second stage sun gear 22 is axially aligned with the axes of shaft 10 and is connected with carrier 18 such that carrier 18 rotates second stage sun gear 22.

A second stage planet gear 24 is supported by a second stage planet gear carrier 26. Second stage planet gear 24 is supported by bearings 27 from pin 28. Planet gear 24 meshes with second stage sun gear 22. There is provided a second stage gear ring 30 which meshes with the second stage planet gear 24.

The wheel 13 is supported from frame 34 by bearings 36. The gear train just described from shaft 10 to wheel 13 has been used in many off road vehicles and typically the ratio of the rate of revolutions per minute of second stage sun gear 22 to wheel 13 is 5 to 1.

We will now discuss the unique braking mechanism. This includes a brake disc 38 which is attached to and supported from disc carrier 40 which is rotatably supported about bearing 42. Bearing 42 is provided with bearing support 44 which is attached to carrier 26. A special, generally cylindrical shaped, floating disc adaptor 48 transfers rotation of second stage sun gear 22 to disc 38. Adapter 48 has a first set of exterior splines 50 which mesh with interior splines on disc carrier 40. The end of adapter 48 which is away from disc 38 surrounds second stage sun gear 22. This portion which surrounds sun gear 22 is provided with splines 52 which mesh or mate with exterior splines on second stage sun gear 22. Adapter 48 is not directly attached to disc 38. However, rotation of second stage sun gear 22 rotates disc 38 at the same rpm as that of the sun gear 22. With this floating adapter, absolute alignment of the axis of second stage sun gear 22 and the center of disc 38 is not required. Means are provided for applying force to disc 38 to effect the braking. This includes a piston 54, brake pad 56 and frame 58.

By using the concept described in this invention, we can operate a brake at speeds between the wheel speed and the motor armature speed. Preferably the brake speed rpm would be at a ratio of about five to one of to the wheel rpm. There are several advantages to using our invention. (1) Lower hydraulic brake pressures can be used than if the brake were operating at the wheel speed. (2) The rubbing velocity of the brake is much less in our system than it would be at armature speed. (3) By taking advantage of gear ratio to increase brake torque, size and structural requirement of brake compartments can be reduced. (4) Another benefit is that by using our system the braking system is easier to package than when using the system where the brake operates at the same speed as the wheel speed. This thus allows a higher energy absorptive capacity for the same mounting space than that which would be available if the brake disc were operated at the same rpm as the wheel. It is also apparent that the brake disc is external of the axle or gear box and is readily accessible.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved braking system for a vehicle drive mechanism having a frame, a drive motor and shaft (10), a wheel, gears for transferring rotation of said shaft to said wheel, said gears including a first stage carrier (18), at least three second stage planet gears 24, the improvement comprising:
   a brake disc;
   a second stage cylindrical sun gear (22) substantially axially aligned with said shaft and having external gear teeth mating with said planet gears (24);
   a brake disc carrier rotatably supporting said brake disc from said frame such that the center of said disc is substantially aligned with the axis of said second stage cylindrical sun gear, said disc carrier having internal spline;
   a floating adapter for transferring rotational motion of said sun gear directly to said disc carrier, said adapter having external splines mating with the splines of said disc carrier and internal splines mating with the external gear teeth of said sun gear, said external and internal splines providing the sole support for said adapter.

2. A braking system as defined in claim 1 including brake calipers supported by said frame for applying a braking force to said brake disc.

3. An improved braking system for a vehicle drive mechanism having a frame, a drive motor and shaft (10), a wheel, gears for transferring rotation of said shaft to said wheel, said gears including a first stage carrier (18) having splines, at least three second stage planet gears (24), the improvement comprising:
   a brake disc;
   a second stage substantially cylindrical sun gear (22) substantially axially aligned with said shaft and having external splines along a first portion, a second portion and a third portion, said first portion mating with the splines of said first stage carrier (18), said second portion mating with the gears of each of said second planet gears (24);
   a brake disc carrier rotatably supporting said brake disc from said frame, such that the center of said disc is substantially aligned with the axis of said second stage cylindrical sun gear (22), said disc carrier having internal splines;
   a floating adapter for transferring rotational motion of said second stage sun gear directly to said disc carrier, said adapter having external splines mating with the internal splines of said disc carrier, said adapter also having internal splines mating with the external splines of said sun gun gear along said third portion, the structure being such that said external and internal splines provide the sole support for said adapter whereby said second stage sun gear in operation can seek its own center in regard to said at least three second stage planet gears to compensate for uneven wear or size dimensions of said second stage planet gears or constructional misalignment of said shaft and the center of said disc or deflection induced misalignment.

4. A braking system as defined in claim 3 in which said second stage planet gear has axial clearance between it and said shaft.

5. An improved braking system for a vehicle drive mechanism which comprises:
   a motor drive shaft;
   a frame support;
   a wheel;
   gear means for transferring rotation from said shaft to said wheel, said gear means including a plurality of second stage planet gears with a second stage sun gear (22) having external gear teeth mating with said second stage planet gears, said sun gear being substantially axially aligned with the axis of said shaft;
   a brake disc;
   means to support the center of rotation of said brake disc approximately with the axis of said sun gear, said means including internal splines coaxial with said sun gear;
   connecting means connecting said sun gear to said brake disc which includes a floating adapter which has external splines on one end and internal splines on the other end, said internal splines of said adapter mating with a portion of the external gear teeth on said sun gear and the external splines of said adapter mating with the internal splines on said disc support means, said external and internal splines providing the sole support for said adapter.

* * * * *